(12) United States Patent
Lee et al.

(10) Patent No.: US 10,235,124 B2
(45) Date of Patent: Mar. 19, 2019

(54) AUDIO ANNOUNCEMENT PRIORITIZATION SYSTEM

(71) Applicant: Google Inc., Mountain View, CA (US)

(72) Inventors: John Jaesung Lee, Wolli Creek (AU); Andrew Shivam Wickham, Mountain View, CA (US); Tomer Amarilio, Palo Alto, CA (US); Benjamin Margolin, San Mateo, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/176,756

(22) Filed: Jun. 8, 2016

(65) Prior Publication Data

US 2017/0357475 A1    Dec. 14, 2017

(51) Int. Cl.
| | |
|---|---|
| *G06F 17/00* | (2006.01) |
| *G06F 3/16* | (2006.01) |
| *G06F 9/451* | (2018.01) |
| *G05B 15/02* | (2006.01) |
| *H04M 1/60* | (2006.01) |
| *H04M 1/725* | (2006.01) |
| *G06F 17/30* | (2006.01) |
| *G06F 9/44* | (2018.01) |
| *G06Q 10/10* | (2012.01) |

(52) U.S. Cl.
CPC ............ *G06F 3/165* (2013.01); *G05B 15/02* (2013.01); *G06F 9/4443* (2013.01); *G06F 9/451* (2018.02); *G06F 17/30769* (2013.01); *G06Q 10/10* (2013.01); *H04M 1/6033* (2013.01); *H04M 1/72527* (2013.01)

(58) Field of Classification Search
CPC ...................................................... G06F 3/165
See application file for complete search history.

(56) References Cited

U.S. PATENT DOCUMENTS

| | | |
|---|---|---|
| 6,542,868 B1 | 4/2003 | Badt et al. |
| 2003/0130850 A1* | 7/2003 | Badt ....................... G10L 13/00 |
| | | 704/270 |
| 2011/0169632 A1* | 7/2011 | Walker ..................... H03G 3/32 |
| | | 340/539.13 |

FOREIGN PATENT DOCUMENTS

WO    WO 2014/042893    3/2014

OTHER PUBLICATIONS

PCT International Search Report for corresponding PCT Application No. PCT/2016/064625, dated Feb. 27, 2017—3 pages.

(Continued)

*Primary Examiner* — Joseph Saunders, Jr.
(74) *Attorney, Agent, or Firm* — Dority & Manning, P.A.

(57) ABSTRACT

Systems and methods for prioritizing audio announcements are provided. In one embodiment, a method can include obtaining, by one or more processors associated with a computing device, an audio notification that comprises a message and a preferred priority associated with the message. The method can include determining, by the one or more processors, an assigned priority associated with the message based at least in part on a content of the message and the preferred priority associated with the message. The method can include generating, by the one or more processors, an output indicative of the message and the assigned priority associated with the message. The method can include providing, by the one or more processors, the output to an audio device to audibly produce the output based at least in part on the priority associated with the message.

20 Claims, 5 Drawing Sheets

(56) References Cited

OTHER PUBLICATIONS

International Preliminary Report on Patentability from PCT/US2016/064625, dated Aug. 28, 2018, 6 pages.
Written Opinion of the International Preliminary Examining Authority from PCT/US2016/064625, dated Apr. 25, 2018, 8 pages.

* cited by examiner

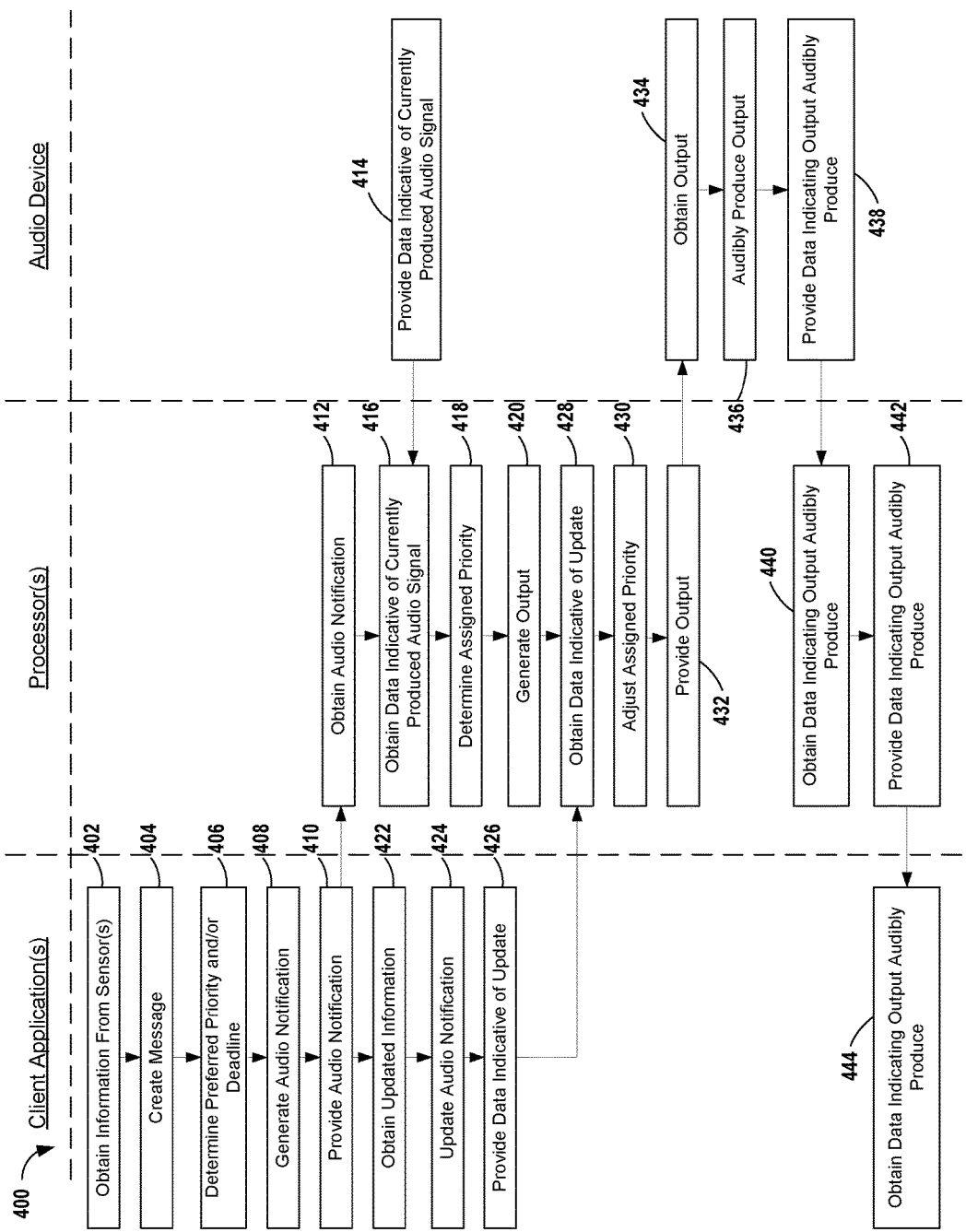

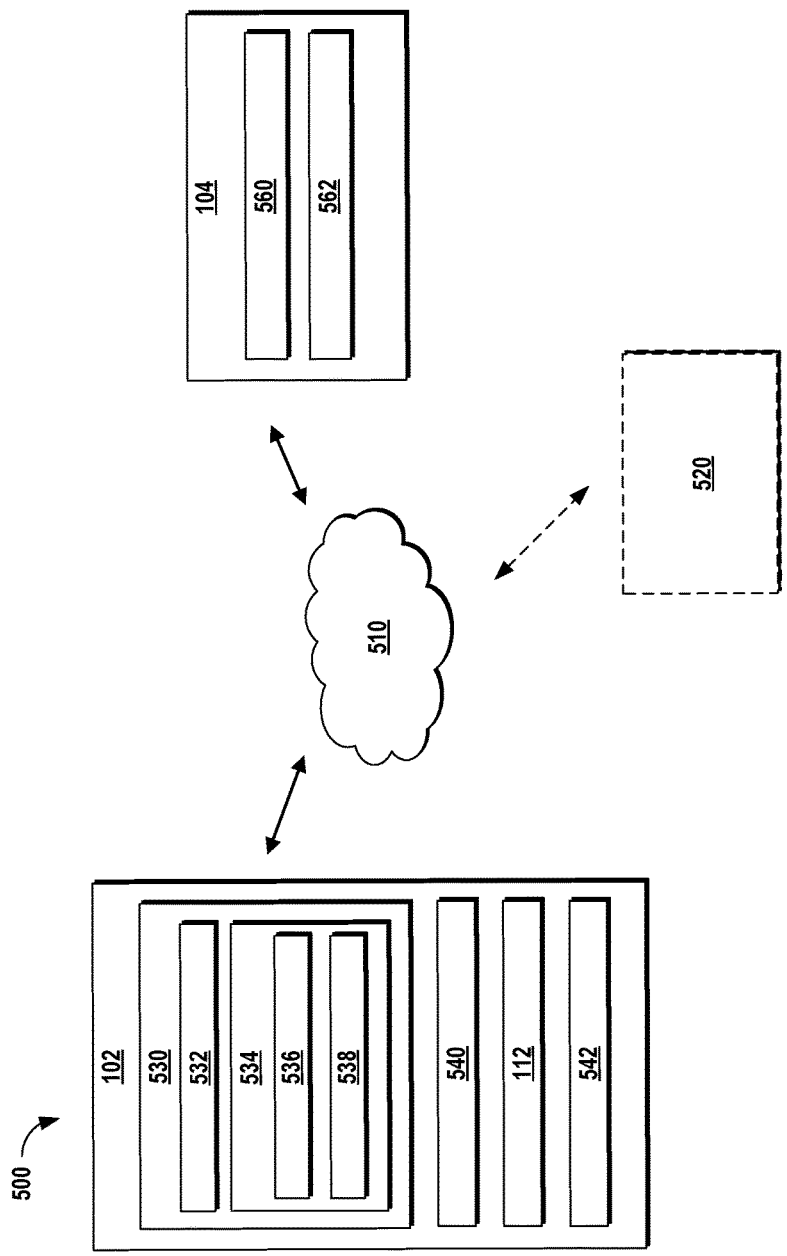

AUDIO ANNOUNCEMENT PRIORITIZATION SYSTEM

FIELD

The present disclosure relates generally to prioritizing audio announcements, and more particularly to systems and methods for prioritizing audio announcements for an audio device.

BACKGROUND

A user device, such as a smartphone, can concurrently run several different software applications. For example, a user device can concurrently run a calendar application, a map application, a web-browser application, a music application, etc. Each of the concurrently running applications can have sounds and/or announcements that are to be played in accordance with the operation of the software application. In some cases, the user device may play the sounds via a speaker included with the user device. In the event that the user device is connected to a separate device (e.g., Bluetooth speaker), the separate device may play the sounds associated with the software applications.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of prioritizing audio announcements for an audio device. The method can include obtaining, by one or more processors associated with a computing device, an audio notification that comprises a message and a preferred priority associated with the message. The method can further include determining, by the one or more processors, an assigned priority associated with the message based at least in part on a content of the message and the preferred priority associated with the message. The method can include generating, by the one or more processors, an output indicative of the message and the assigned priority associated with the message. The method can further include providing, by the one or more processors, the output to an audio device to audibly produce the output based at least in part on the assigned priority associated with the message.

Another example aspect of the present disclosure is directed to a computing device. The computing device can include one or more processors and one or more memory devices. The one or more memory devices can store instructions that when executed by the one or more processors cause the one or more processors to perform operations. The operations can include obtaining a plurality of audio notifications from a plurality of client applications. Each audio notification can include a set of data indicative of a message and a preferred priority associated with the message. The operations can further include determining, for each message of the plurality of audio notifications, an assigned priority based at least in part on a content of the respective message and the preferred priority associated with the respective message. The operations can include generating one or more outputs indicative of one or more of the messages and the assigned priority of each of the one or more messages. The operations can further include providing the one or more outputs to an audio device.

Yet another example aspect of the present disclosure is directed to one or more tangible, non-transitory computer-readable media storing computer-readable instructions that when executed by one or more processors cause the one or more processors to perform operations. The operations can include obtaining one or more audio notifications that comprise one or more messages and one or more preferred priorities associated with the one or more messages. The operations can further include determining an assigned priority for each of the one or more messages based at least in part on a content of each of the one or more messages and the preferred priority associated with each of the one or more messages. The operations can include generating one or more outputs indicative of the one or more messages and the assigned priority associated with each of the one or more messages. The operations can further include providing the one or more outputs to an audio device to audibly produce the one or more outputs based at least in part on the assigned priority associated with each of the one or more messages.

Other example aspects of the present disclosure are directed to systems, apparatus, tangible, non-transitory computer-readable media, user interfaces, memory devices, and electronic devices for prioritizing audio announcements.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 4 depicts a flow chart of an example method for prioritizing audio announcements according to example embodiments of the present disclosure; and FIG. 5 depicts an example system according to example embodiments of the present disclosure.

DETAILED DESCRIPTION

Figure 1:
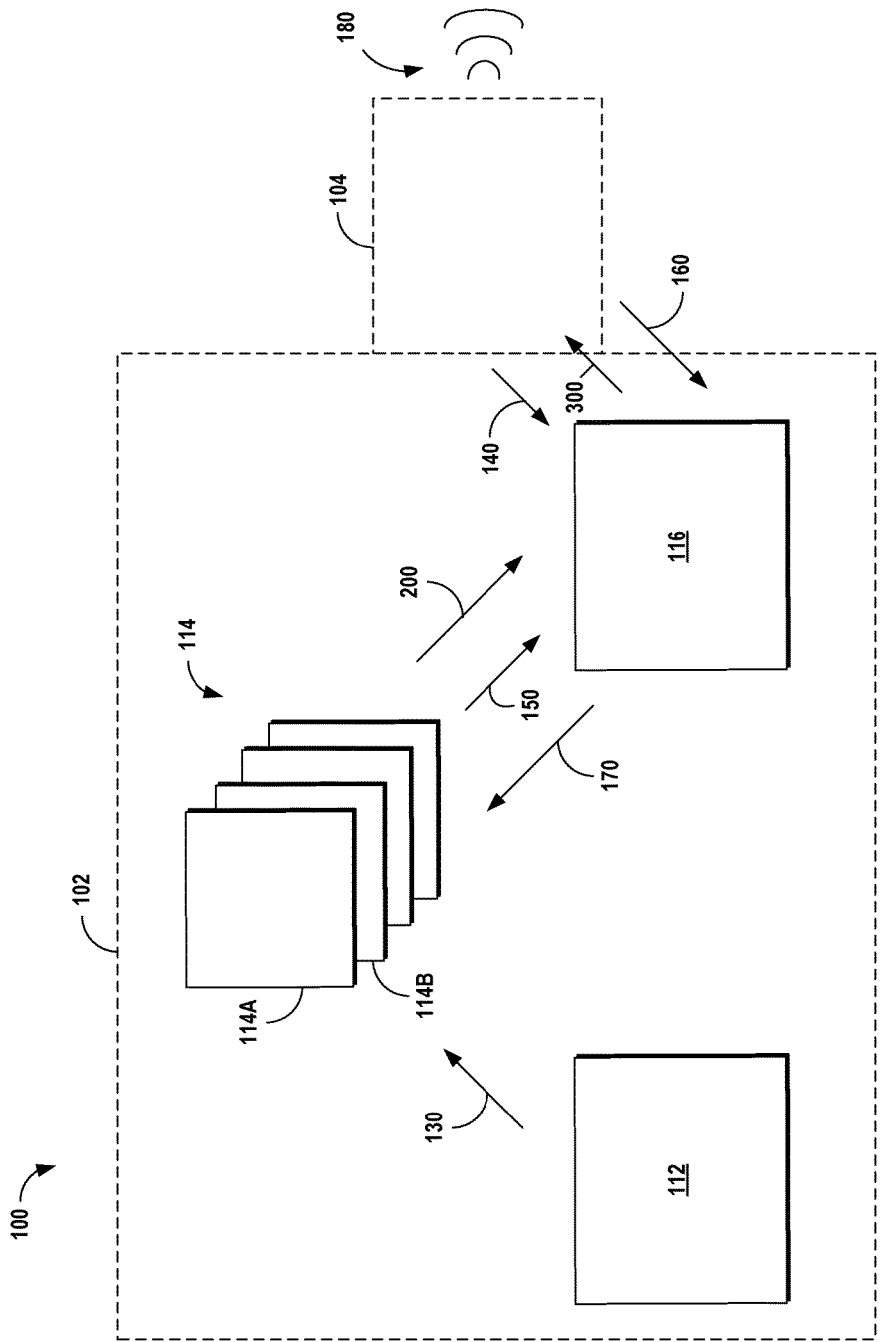
FIG. 1 depicts an example system according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to prioritizing audio announcements. As used herein, an audio device can be a device that is configured to produce audio signals (e.g., speaker, Bluetooth headset, etc.). The systems and methods of the present disclosure are directed to prioritizing audio announcements for such an audio device. For instance, the audio device can be associated with a computing device, such as a phone, tablet, wearable device, etc. Client applications running on the computing device can have multiple audio notifications for the audio device to play. An application programming interface (API) of the computing device can allow the client applications to submit audio announcements to a controller application for prioritization. By way of example, a navigation application can submit a first audio notification that indicates that a user associated with the computing device should "exit in 0.5 miles". An email application can submit a second audio notification that indicates that the user has received an email message. With each message, the client application can submit a preferred priority, indicating how it prefers to have the message prioritized. The controller application can obtain each of these audio notifications and assign a priority to each of them such that the audio device can identify which notification to play over the other. The assigned priority can be based on the content of the messages and/or the preferred priorities. For example, the controller application can assign a higher priority to the first audio notification (e.g., indicating the imminent exit) than to the second audio notification (e.g., indicating the email receipt), such that the audio device can play the navigation notification over, before, ahead of, instead of, etc. the email notification. In this way, the computing device can ensure that the user receives important audio notifications in the event of a conflict.

More particularly, the computing device can include one or more processor(s) that can implement the application programming interface and operate to perform the functions of the controller application. For instance, the processor(s) can obtain one or more audio notification(s) from the client applications running on the computing device. The audio notification(s) can include one or more message(s) and one or more preferred priorities associated with the one or more messages. By way of example, a user associated with the computing device can be travelling according to instructions provided by a navigation client application. The processor(s) can obtain an audio notification from the navigation client application. The audio notification can include a message associated with a navigation audio announcement (e.g., "exit in 0.5 mile"). Moreover, the audio notification can include a preferred priority associated with the message. The preferred priority can be indicative of a priority that the client application prefers the controller application to afford to the message relative to other messages. For example, the preferred priority of the message associated with the navigation audio announcement can be "high" indicating that the navigation client application would prefer the message to be prioritized by the audio device (e.g., played over, played instead of, played ahead of, played before, etc.) relative to other messages.

Additionally, and/or alternatively, the computing devices can include an email client application that provides updates regarding email messages. The processor(s) can obtain an audio notification from the email client application. For example, the audio notification can include a message indicating that the computing device has received an email (e.g., "email received from John Doe"). The preferred priority of the message associated with the email audio announcement can also be "high".

The processor(s) can determine an assigned priority for each of the one or more message(s). The assigned priority can indicate the priority that is assigned (e.g., by the processors) to the message and is to be used by the audio device. The assigned priority can be based, at least in part, on a content of the each of the message(s) and the preferred priority associated with each of the message(s). For instance, the processors can examine the content of the navigation announcement message, the email announcement message, the preferred priorities associated with each, etc. Additionally, and/or alternatively, the processors can compare the content of the messages to determine which may be of greater (and/or lesser) importance to the user of the computing device. By way of example, although both the navigation announcement message and the email announcement message have preferred priorities of "high," the processors can resolve such a conflict and determine that the navigation announcement message is likely of greater importance to a user due to the imminent exit instruction. Accordingly, the processors can determine that the assigned priority of the navigation announcement message is "high" while the assigned priority of the email announcement message is "medium," such that the navigation announcement message is prioritized ahead of the email message.

In some implementations, the preferred priorities and/or the assigned priorities can be based on other parameters. For example, the preferred priority and/or the assigned priority associated with the navigation announcement message can be based, at least in part, on the distance of the computing device to a subject of the navigation announcement message (e.g., from the computing device to the next turn) and/or a speed of the computing device. For instance, the shorter distance from the computing device to the next upcoming turn, the higher preferred priority and/or assigned priority. The speed of the computing device can allow the client application (and/or the processors) to estimate the amount of time until the user reaches the next turn (e.g., the distance divided by the speed). The estimated amount of time and the length of the message can be used to determine a time threshold for playing the message. For example, if the user is 30 seconds away from the next turn, and the navigation announcement message will take 5 seconds to read, the assigned priority can be determined such that the audio device plays the message in 25 seconds or less.

In some implementations, the audio notifications can be updated. The client applications can update the content of the message and/or the preferred priority and send data indicating the update to the processor(s). By way of example, the preferred priority can increase as the distance and/or estimated time shortens. If the original announcement was "exit in 0.5 miles" with a "high" priority, and the message still hasn't been read by the audio device, the preferred priority can be increased (e.g., to "very high") if the user is within e.g., 0.25 miles of the exit, and then again to a "super" priority (as described herein) if the user is within 500 feet of the exit. The processor(s) can obtain such updates and adjust the assigned priority based, at least in part, on the set of data indicative of the update to the notification.

Additionally, and/or alternatively, the audio notifications obtained from the client applications can include a deadline associated with the message. For example, the notification can include a message of "exit in 1 mile" with a deadline of 1 minute and a "low" preferred priority. This can indicate that that audio device can continue playing other messages, but that the audio device should interrupt and forcibly play the navigation announcement message (e.g., "exit in 1 mile") if the audio device has not already done so within that 1 minute. The processor(s) can determine the assigned priority based, at least in part, on such a deadline.

The processor(s) can generate outputs to be sent to the audio device. For instance, the processor(s) can generate one or more output(s) indicative of the one or more message(s) and the assigned priority associated with each of the one or more message(s). In some implementations, the output(s) can include a deadline associated with a message, as described herein. The processor(s) can provide the one or more output(s) to the audio device to audibly produce (e.g., play, read, announce) the output(s) based, at least in part, on the assigned priority associated with each of the one or more message(s).

The audio device can play the messages based, at least in part, on the assigned priorities associated therewith. For example, in the event that the assigned priority of the navigation announcement message is "high," the audio devices can be configured to interrupt an audio signal that is current playing (e.g., a song, podcast) to play the navigation announcement message. In the event that the assigned priority of the email announcement message is "medium," the audio devices can be configured to wait to play the email announcement message until there is a break in an audio signal that is current playing and/or until after the messages of higher assigned priority have been played. The audio device can indicate to the processor(s) when a message has been played, which, in turn, allows the processor(s) to notify the client applications when the message has been played.

Prioritizing audio announcements associated with a computing device according to example aspects of the present disclosure can help ensure that important announcements are communicated to a user. Moreover, the systems and methods of the present disclosure can help reduce the interruption of current audio signals with low priority announcements for which a user gives little importance. The systems and methods of the present disclosure can also be implemented to prioritize announcements for audio devices that have limited processing capabilities to make such priority determinations.

With reference now to the FIGS., example embodiments of the present disclosure will be discussed in further detail. FIG. 1 depicts an example system 100 for prioritizing audio announcements according to example embodiments of the present disclosure. As shown, the system 100 can include a computing device 102 and an audio device 104. The computing device 102 can be, for instance, a smartphone, tablet, wearable device, laptop, desktop, mobile device, device capable of being carried by a user while in operation, display with one or more processors, vehicle system, and/or other user device. The audio device 104 can be a device that is configured to produce audio signals, such as for example, a speaker, Bluetooth headset, car audio system, portal audio system, and/or other audio devices. In some implementations, the audio device 104 may include a display screen, while in some implementations the audio device 104 may not include a display screen. The computing device 102 and the audio device 104 can be configured to communicate via wired and/or wireless connection. In some implementations, the computing device 102 and the audio device 104 can be physically coupled to one another and/or the audio device 104 can be included as a component of the computing device 102. In some implementations, the audio device 104 can be physically separate and apart from the computing device 102.

The computing device 102 can include various components for performing various operations and functions. For example, and as further described herein, the computing device 102 can include one or more processor(s) and one or more memory device(s). The one or more memory device(s) can store instructions that when executed by the one or more processor(s) cause the one or more processor(s) to perform the operations and functions, for example, such as those described herein for prioritizing audio announcements for the audio device 104.

As shown in FIG. 1, the computing device 102 can include one or more sensor(s) 112, a plurality of client software applications 114, and a controller application 116. The sensor(s) 112 can include accelerometers, gyroscopes, ambient light sensors, beacons, proximity sensors, compasses, location sensors (e.g., location sensors based on GPS, Wi-Fi, and Cellular Signals), position sensors, orientation sensors, receivers, microphones, and/or other sensor devices. The sensor(s) 112 can be configured to collect, monitor, and/or determine various information associated with the computing device 102 (e.g., location information) and send such information to one or more of the client application(s) 114.

The client applications 114 can be implemented on the computing device 102. The client application applications 114 can be, for instance, a navigation application, a mapping application, an email application, a podcast application, a browser, a ride share application, an application used to assist with delivery, a social media application, and/or other software applications. The client application(s) 114 can be stored locally on the computing device 102 and/or can be, for instance, a web application accessed via a browser implemented on the computing device 102. In some implementations, the client application(s) 114 can be developed by a third party entity that is independent of and/or not affiliated with an entity associated with the computing device 102 and/or the controller application 116.

The controller application 116 can be implemented on the computing device 102. The controller application 116 can be a software application that can prioritize audio announcements associated with different client application(s) 114. The controller application 116 may or may not have a graphical user interface (GUI) associated therewith for user interaction with the controller application 116. For example, in some implementations, a user may be allowed to control various settings for determining priorities, as described herein. An application programming interface (API) of the computing device 102 can allow the client application(s) 114 to submit audio announcements to the controller application 116 for prioritization. In some implementations, the controller application 116 can be implemented by one or more processor(s) (e.g., of one or more cloud-based server(s)) that are remote from the computing device 102. In some implementations, the processor(s) of the computing device 102 can operate to perform the functions of the controller application 116 to prioritize audio announcements associated with different client applications 114.

The client applications 114 can obtain information 130 from the sensor(s) 112. The information 130 can be indicative of one or more condition(s) associated with the computing device 102 and/or a user thereof. For example, at least one of the client applications (e.g., 114A) can be associated with a navigation functionality. The navigation client application 114A can obtain information 130 (e.g., from a location sensor) that is indicative of a location and/or a position of the computing device 102. In another example, at least one of the client applications (e.g., 114B) can be associated with an email functionality. The email client application 114B can obtain information 130 indicating that the user of the computing device 102 has received an email message in her inbox.

The client applications 114 can create a message based, at least in part, on the information 130 obtained from the sensor(s) 112. For instance, the navigation client application 114A can create one or more message(s) associated with a navigation instruction based, at least in part, on the location information (e.g., provided by the sensor(s) 112) relative to a navigation route (e.g., that is determined by the navigation client application 114A, requested by a user, provided for direction). By way of example, the message can indicate a suggested navigation instruction (e.g., "exit in 500 ft."). Additionally, and/or alternatively, the email client application 114B can create one or more message(s) associated with an email announcement (e.g., "email received from John Doe") based, at least in part, on the information 130 it obtained (e.g., time, name of sender, subject of email).

The client applications 114 can determine a preferred priority associated with the message. The preferred priority can be indicative of a priority that the client application 114 prefers the controller application 116 to afford to the message relative to other messages. For example, the preferred priority of the message associated with a navigation announcement can be "high" indicating that the navigation client application 114A would prefer the message to be prioritized by the audio device 104 (e.g., played over, played instead of, played ahead of, played before, etc.) relative to other messages. Additionally, and/or alternatively, the preferred priority of the message associated with an email announcement can be "high" indicating that the email client application 114B would prefer the message to be prioritized by the audio device 104 relative to other messages. The preferred priority associated with the message can be based, at least in part, on a variety of parameters, as further described herein.

Figure 2:
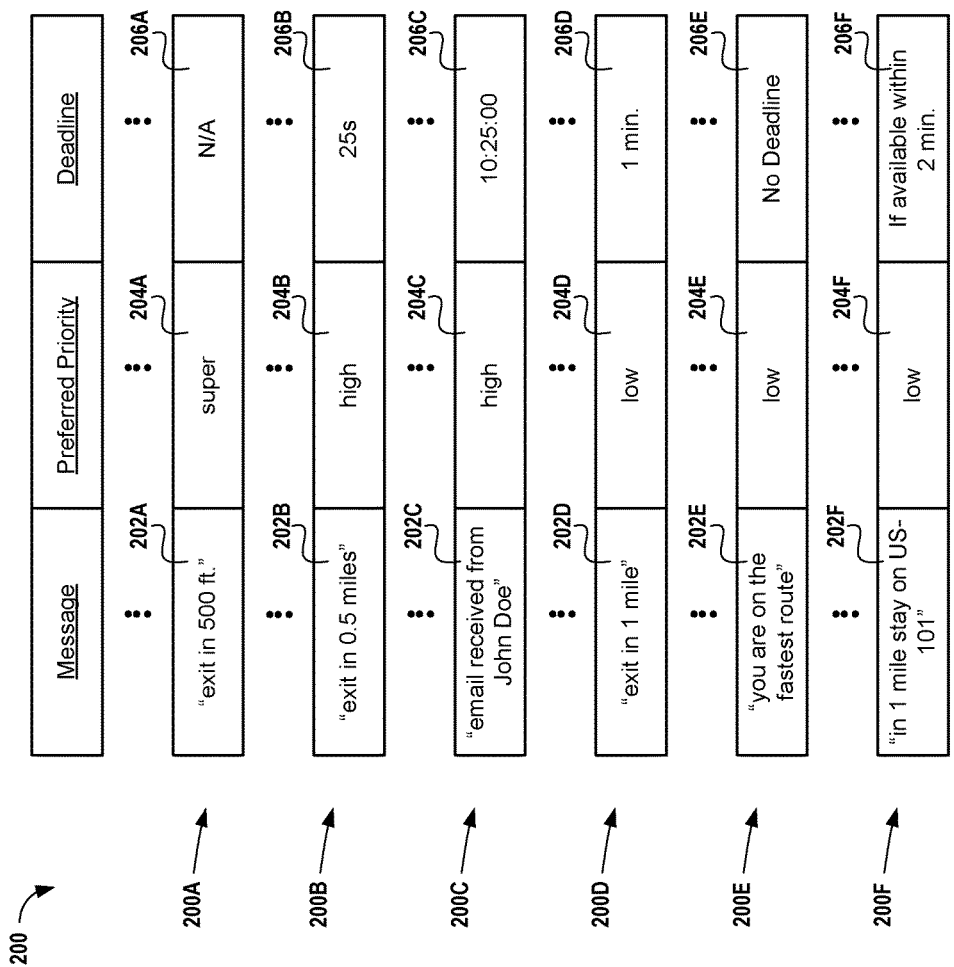
FIG. 2 depicts example audio notifications according to example embodiments of the present disclosure.

The client applications 114 can generate one or more audio notification(s). For example, FIG. 2 depicts example audio notifications 200 according to example embodiments of the present disclosure. Each audio notification 200A-F of the plurality of notifications 200 can include a set of data. For instance, each audio notification 200A-F can include a set of data indicative of a message 202A-F and a preferred priority 204A-F associated with the message 202A-F.

In some implementations, the preferred priority 204A-F can be based, at least in part, on a type of the client application 114A. By way of example, a client application (e.g., 114A) can determine that navigation announcement messages (e.g., 202A) from the navigation client application 114A are more important than any other type of message. As such, the client application 114A can determine that the preferred priority 204A of the message 202A is a "super" priority such that an audio signal indicative of the message is prioritized by the audio device over all other messages. In some implementations, only certain types of client applications 114 can use the "super" priority designation, such that the audio device interrupts any other audio currently being played in favor of the "super" priority message.

Additionally, and/or alternatively, the preferred priority 204A-F can be based, at least in part, on a content of the message. For example, a navigation announcement message 202B indicating to "exit in 0.5 miles" can be associated with a "high" preferred priority 204B, while a navigation announcement message 202E indicating "you are on the fastest route" can be associated with a "low" preferred priority 204E. In another example, a message indicating that "the software of the computing device has been updated" can be associated with a "low" preferred priority.

Additionally, and/or alternatively, the preferred priority 204A-F can be based, at least in part, on a distance associated with the computing device 102. For instance, the preferred priority associated with a navigation announcement message can be based, at least in part, on the distance of the computing device 102 to a subject of the navigation announcement message (e.g., from the computing device 102 to the next exit). By way of example, a navigation announcement message 202D indicating to "exit in 1 mile" can be associated with a "low" preferred priority 204D, a navigation announcement message 202B indicating to "exit in 0.5 miles" can be associated with a "high" preferred priority 204B, and a navigation announcement message 202A indicating to "exit in 500 ft." can be associated with a "super" preferred priority 204A. In this way, the shorter distance from the computing device 102 to the next upcoming exit, the higher the preferred priority. Accordingly, messages that are of lower urgency (e.g., due to a greater distance from the computing device to a subject) can be submitted to the controller application 116 with a lower preferred priority.

Additionally, and/or alternatively, the preferred priority 204A-F can be based, at least in part, on a speed associated with the computing device 102. For instance, the speed of the computing device 102 can allow the client application 114 (and/or the processors of the computing device 102) to estimate the amount of time until the computing device 102 reaches the next exit (e.g., the distance divided by the speed). The estimated amount of time and the length of the message can be used to determine a time threshold for playing the message. For example, if the computing device 102 is 30 seconds away from the next exit, and the navigation announcement message (e.g., 202B) will take 5 seconds to read, the preferred priority (e.g., 204B) can be determined such that the audio device can audibly produce the message in 25 seconds or less.

Additionally, and/or alternatively, the audio notifications 200A-F can include a deadline 206A-F associated with the message 202A-F. For example, the audio notification 200D can include a message 202D of "exit in 1 mile" with a deadline 206D of "1 min." and a "low" preferred priority 204D. This can indicate that the audio device 104 can continue playing other messages, but that the audio device 104 should interrupt and forcibly play the navigation announcement message (e.g., "exit in 1 mile") if the audio device 104 has not already done so within that 1 minute.

In some implementations, the deadline 206A-F can be associated with a timestamp indicating a time by which the audio device 104 should audibly produce the message 202A-F. For example, the deadline 206C can indicate that the message 202C (e.g., "email received from John Doe") should be audibly produced by "10:25:00". Additionally, and/or alternatively, the deadline 206A-F can be associated with a delay indicating a time period by which the audio device 104 should audibly produce the message 202A-F. For example, the deadline 206B can indicate that the message 202B (e.g., "Exit in 0.5 miles") should be audibly produced by the audio device 104 within the next "25s". In some implementations, the deadline can be indicative of the time threshold for playing the message (e.g., as determined from the speed and/or distance of the computing device 102).

One or more message(s) can include a deadline such that if the message does not get audibly produced within a certain time interval, the audio device 104 can disregard playing the message at all. For example, the message 202F can indicate to a user of the computing device 102 and/or the audio device 104 that "in 1 mile, stay on US-101". The associated deadline 206F can indicate that if there is available time within the next 2 minutes, the audio device 104 should audibly produce the message 202F, but that if such time is not available within the next 2 minutes—the audio device 104 should disregard the audio notification 200F including the message 202F. This can allow the computing device 102 (and/or audio device 104) to disregard messages that have become irrelevant (or less relevant) after a certain time period.

In some implementations, the audio notification 200A-F can indicate that the audio device 104 can wait an arbitrarily long time period to audibly produce the message 202A-F in the event that the audio device 104 is audibly producing other messages. For example, the audio notification 200E can include a "no deadline" indication 206E for the message 202E (e.g., "you are on the fastest route"). In this way, the client application 114 can indicate that the message 202E can be heard by the user at any point along her trip. Additionally, and/or alternatively, in some implementations the audio notification (e.g., 200A) can indicate that the application controller 116 should not consider a deadline. This can be done, for example, by including a "N/A", blank, zero, etc. as the deadline (e.g., 206A) and/or in a deadline field associated with a particular message 202A.

The processor(s) implementing the controller application 116 can be configured to obtain the plurality of audio notifications 200A-F from the plurality of client applications 114. By way of example, the processor(s) can obtain an audio notification 200B from the navigation client application 114A. The audio notification 200B can include a message 202B (e.g., "exit in 0.5 miles") with an associated "high" preferred priority 204B and/or a deadline 206B (e.g., "25s"). The processor(s) can also obtain an audio notification 200C from the email client application 114B. The audio notification 200C can include a message 202C (e.g., "email received from John Doe") with an associated "high" preferred priority 204C and/or a deadline 206C (e.g., "10:25: 00"). In some implementations, the processor(s) (and/or portions of the processor(s)) implementing the controller application 116 can obtain the audio notifications 200A-F from the processor(s) (and/or portions of the processor(s)) implementing one or more of the client application(s) 114.

The processor(s) can be configured to determine, for each message 202A-F of the plurality of audio notifications 200A-F, an assigned priority based, at least in part, on a content of the respective message 202A-F and/or the preferred priority 206A-F associated with the respective message 202A-F. Additionally, and/or alternatively, an assigned priority can be based, at least in part, on any of the parameters, factors, and/or conditions (e.g., message content, type of application, distance, speed, etc.) upon which the preferred priorities 204A-F are based (as described herein). In some implementations, an assigned priority associated with a first message can be based, a least in part, on one or more other messages (e.g., their associated message content, type of application, distance, speed, preferred priorities, assigned priorities, deadlines, etc.).

An assigned priority can indicate the actual priority that is assigned to the message 202A-F and is to be used by the audio device 104 for prioritizing messages. For instance, the processor(s) can examine the content of the navigation announcement message 202B, the email announcement message 202C, the preferred priorities 204B-C associated with each, and/or any associated deadlines 206B-C to determine an assigned priority of each of the messages 202B-C. The processor(s) can compare the content of the messages 202B-C to determine which may be of greater (and/or lesser) importance to the user of the computing device 102. By way of example, although both the navigation announcement message 202B and the email announcement message 202C have preferred priorities 204B-C of "high," the processor(s) can resolve such conflicts and determine that the navigation announcement message 202B is likely of greater importance to a user due to the imminent exit instruction. Accordingly, the processor(s) can determine that the assigned priority of the navigation announcement message 202B is "high" while the assigned priority of the email announcement message 202C is "medium," such that the navigation announcement message 202B is prioritized ahead of the email message 202C.

In some implementations, the processor(s) can determine the assigned priority based on what is currently being played by the audio device 104. For instance, returning to FIG. 1, the processor(s) can obtain a set of data 140 indicative of an audio signal that is currently being audibly produced by the audio device 104. By way of example, the set of data 140 can indicate a song, podcast, email, navigation instruction, etc. that is currently being audibly produced by the audio device 104. The processor(s) can determine the assigned priority based, at least in part, on the audio signal that is currently being audibly produced by the audio device 104. For example, the processor(s) can determine that the assigned priority of a message should be higher or lower, such that the message is prioritized over (or under) the audio signal that is currently being audibly produced by the audio device 104.

Figure 3:
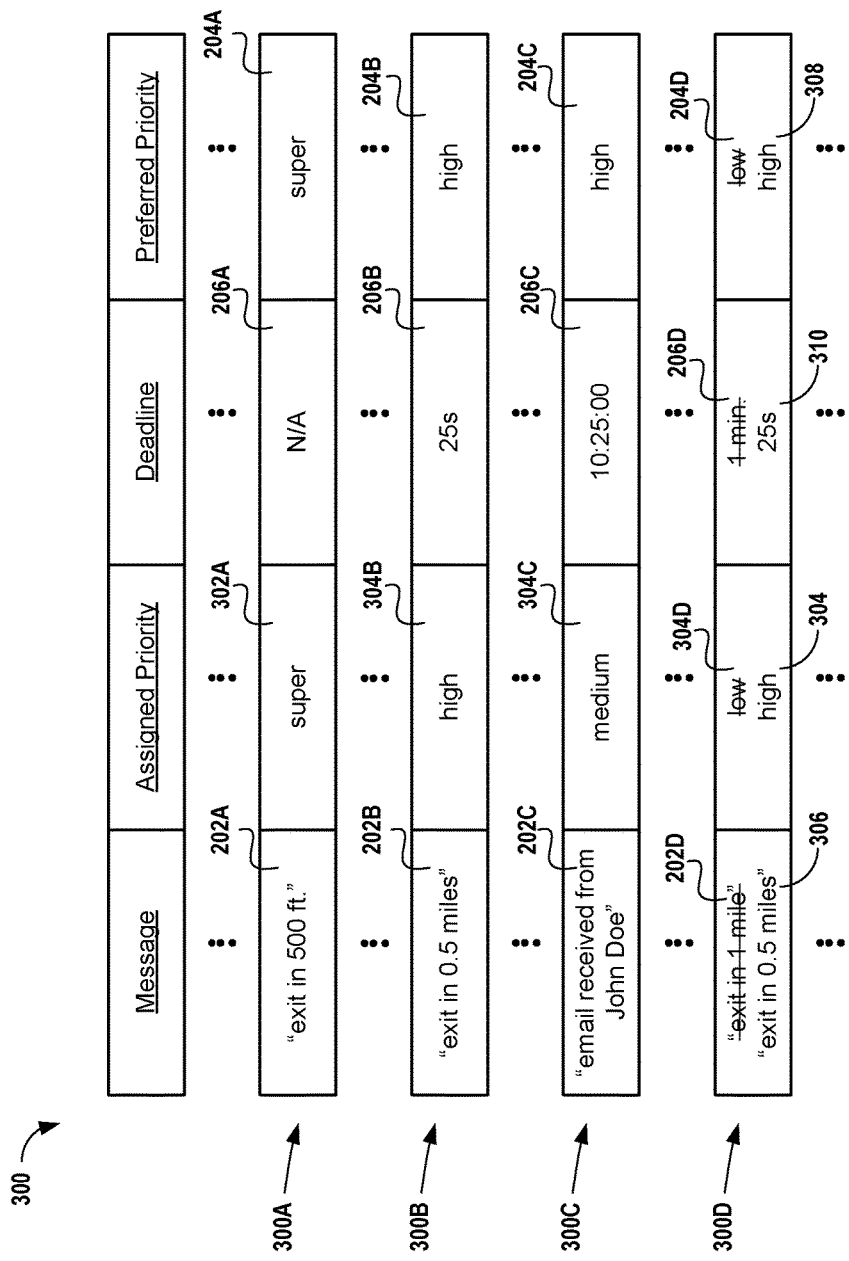
FIG. 3 depicts example outputs of a computing device according to example embodiments of the present disclosure.

The processor(s) implementing the controller application 116 can be configured to generate outputs indicative of the messages and the assigned priorities associated therewith. For example, FIG. 3 depicts example outputs 300 of a computing device 102 according to example embodiments of the present disclosure. Each output 300A-D can be indicative of a message 202A-D and the assigned priority 302A-D associated with the message 202A-D. In some implementations, the output 300A-D can include the deadline 206A-D. In some implementations, the output 300A-D can include the preferred priority 202A-D.

The processor(s) can be configured to generate one or more output(s) 300A-D indicative of one or more of the message(s) 202A-D and the assigned priority 302A-D of each of the one or more message(s) 202A-D. By way of example, the output 300C can include the email announcement message 202C and the assigned priority 302C associated with the message 202C. As shown, a "medium" assigned priority 302C has been determined by the processor(s) for the message 202C (e.g., "email received from John Doe"), although the preferred priority 202C submitted from the email client application 114B was "high".

In some implementations, the audio notifications 200 and/or the generated outputs 300 can be updated. For instance, returning to FIG. 1, the client applications 114 can obtain additional information from the sensor(s) 112 indicating a change in a condition associated with the computing device 102. The client applications 114 can send a set of data 150 indicative of an update to the audio notification 200A-F that revises at least one of the content of message 202A-F, the preferred priority 204A-F associated with the message 202A-F, and/or the deadline 206A-F associated with the message 202A-F. The processor(s) implementing the controller application 116 can obtain the set of data 150 and adjust the assigned priority 302A-D based, at least in part, on the set of data 150 indicative of the update to the audio notification 200.

By way of example, the navigation client application 114A can obtain information from the sensor(s) 112 indicating that the computing device 102 has changed locations such that it is 0.5 miles to the upcoming exit. The navigation client application 114A can update the content of the original message 202D (e.g., "exit in 1 mile") to an updated message (e.g., "exit in 0.5 miles"). Additionally, and/or alternatively, the navigation client application 114A can update the preferred priority from the original preferred priority 204D (e.g., "low") to an updated preferred priority (e.g., "high"). The navigation client application 114A can also, and/or alternatively, update the original deadline 206D to an updated deadline. The client application 114A can include the updated message, updated preferred priority, and/or updated deadline in the set of data 150 indicative of an update to the audio notification 200D and send the set of data 150 to the controller application 116 (e.g., the processor(s) associated therewith).

Returning to FIG. 3, the processor(s) can adjust the output 300D based, at least in part, on the set of data 150. For example, the processor(s) can adjust the originally assigned priority 302D (e.g., "low") to an updated assigned priority 304 (e.g., "high") based, at least in part, on the updated message 306 (e.g., "exit in 0.5 miles"), the updated preferred priority 308 (e.g., "high"), and/or the updated deadline 310 (e.g., 25s). In some implementations, the assigned priority can be adjusted based, at least in part, on an update to the audio signal that is currently being audibly produced by the audio device 104.

Returning to FIG. 1, the processor(s) can be configured to provide the one or more output(s) 300 to the audio device 104. The audio device 104 can be configured to audibly produce the outputs 300A-D based, at least in part, on the assigned priorities 302A-D. The audio device 104 can audibly produce the output 300A-D by producing an audio signal 180 indicative of the message. For example, the audio device 104 can audibly produce an audio signal 180 indicating to a listener the message 202A (e.g., "exit in 500 ft.") before audibly producing an audio signal 180 indicating the message 202C (e.g., "email received by John Doe") so that the listener can react accordingly.

In some implementations, the processor(s) can delay and/or disregard an audio notification 200 and/or output 300 to further prioritize the message(s) 202A-F. The processor(s) can be configured to delay the provision of at least one output 300A-D to the audio device 104 based, at least in part, on the assigned priority 302A-D of the message indicated in the at least one output 300A-D. By way of example, the processors can be configured to delay providing the output 300C (with a "medium" assigned priority 302C) to the audio device 104 until after the processor(s) have provided the outputs with higher assigned priorities to the audio device 104 and/or until after the audio device 104 has audibly produced the outputs with higher priority.

In some implementations, the processor(s) can disregard one or more of the audio notification(s) 200A-F based, at least in part, on at least one of the content of the message 202A-F, the preferred priority 204A-F associated with the respective message, and/or the assigned priority 302A-D associated with the respective message. For example, the processor(s) can disregard the audio notification 200E based on the content of the message 202E (e.g., "you are on the fastest route") and/or the preferred priority 202E (e.g., "low"), such that an output including the message 202E is not provided to the audio device 104. In this way, the processor(s) can take further proactive steps to prioritize the messages heard by a listener.

In some implementations, the client applications 114 can continue to provide updates until a message is audibly produced by the audio device 104. For instance, the processor(s) can obtain a set of data 160 indicating that the audio device 104 has audibly produced the output 300A-D. The processor(s) can send (e.g., to the client applications 114) a second set of data 170 indicating that the audio device 104 has audibly produced the output 300A-D. This can inform the client applications 114 that the audio device 104 has audibly produced the message. Accordingly, the client applications 114 can cease updating the audio notifications associated with the message that has been audibly produced.

FIG. 4 depicts a flow chart of an example method 400 for prioritizing audio announcements according to example embodiments of the present disclosure. One or more portions of method 400 can be implemented by one or more processor(s) (e.g. processor(s) depicted in FIG. 5 implementing controller application 116), client application(s) (e.g., client applications 114 depicted in FIG. 1) and audio device(s) (e.g., audio device 104 depicted in FIGS. 1 and 5). FIG. 4 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (402) the method 400 can include obtaining information from one or more sensor(s). For instance, the client applications 114 can obtain information 130 from the sensor(s) 112. The information 130 can be indicative of one or more condition(s) associated with the computing device 102 and/or a user thereof. For example, at least one of the client applications (e.g., 114A) can be associated with a navigation functionality. The navigation client application 114A can obtain information 130 (e.g., from a location sensor) that is indicative of a location and/or a position of the computing device 102. In another example, at least one of the client applications (e.g., 114B) can be associated with an email functionality. The email client application 114B can obtain information 130 indicating that the user of the computing device 102 has received an email message in her inbox.

At (404), the method 400 can include creating a message. The client applications 114 can create a message 202A-F based, at least in part, on the information 130 obtained from the sensor(s) 112. For instance, the navigation client application 114A can create one or more message(s) 202B (e.g., "exit in 500 ft.") associated with a navigation instruction based, at least in part, on the location information (e.g., provided by the sensor(s) 112). Additionally, and/or alternatively, the email client application 114B can create one or more message(s) 202C associated with an email announcement (e.g., "email received from John Doe").

At (406), the method 400 can include determining a preferred priority and/or a deadline associated with the message. The client applications 114 can determine a preferred priority 204A-F associated with the message 202A-F. For example, the preferred priority of the message 202B associated with a navigation announcement can be "high" indicating that a navigation client application 114A would prefer the message to be prioritized by the audio device 104 (e.g., played over, played instead of, played ahead of, played before, etc.) relative to other messages. Additionally, and/or alternatively, the preferred priority 204C of the message 202C associated with an email announcement can be "high" indicating that the email client application 114B would prefer the message to be prioritized by the audio device 104 over other messages. As described herein, the preferred priority 204A-F associated with the message 202A-F can be based, at least in part, on a variety of parameters.

Additionally, and/or alternatively, the audio notifications 200A-F can include a deadline 206A-F associated with the message 202A-F, as described herein. For example, the notification can include a message of "exit in 1 mile" with a deadline of 1 minute and a "low" preferred priority. This can indicate that that audio device 104 can continue playing other messages, but that the audio device 104 should interrupt and forcibly play the navigation announcement message (e.g., "exit in 1 mile") if the audio device 104 has not already done so within that 1 minute.

At (408), the method 400 can include generating an audio notification. For instance, the client applications 114 can generate one or more audio notification(s) 200A-F and can send the audio notification(s) 200A-F to the processor(s) implementing the audio controller 116, at (410). The processor(s) can obtain an audio notification 200A-F that includes a message 202A-F and a preferred priority 204A-F associated with the message 202A-F, at (412).

In some implementations, the method can include providing and/or obtaining data indicating what is currently being audibly produced by the audio device 104. For instance, at (414), the audio device 104 can provide a set of data 140 indicative of an audio signal that is currently being audibly produced by the audio device 104. At (416), the processor(s) can obtain the set of data 140 indicative of an audio signal that is currently being audibly produced by the audio device 104.

At (418), the method 400 can include determining an assigned priority. For instance, the processor(s) can determine an assigned priority (e.g., 302A-D) associated with the message (e.g., 202A-D) based, at least in part, on a content of the message (e.g., 202A-D) and/or the preferred priority (e.g., 204A-D) associated with the message (e.g., 202A-D). In some implementations, the processor(s) can determine the assigned priority 302A-D (for one message) based, at least in part, on one or more other audio notification(s). For instance, the processor(s) can compare the content of the message 202B and 202C to determine which may be of greater (and/or lesser) importance to the user of the computing device 102 and/or the audio device 104. By way of example, although both the navigation announcement message 202B and the email announcement message 202C have preferred priorities of "high," the processor(s) can determine that the navigation announcement message 202B is likely of greater importance to a user (e.g., due to the imminent exit instruction, application type). Thus, the processor(s) can determine that the assigned priority 302B of the navigation announcement message 202B is "high" while the assigned priority 302C of the email announcement message 202C is "medium".

The assigned priority 302A-D and/or the preferred priority 202A-F can be based, at least in part, on other factors. For instance, in some implementations, at least one of the preferred priority 204A and/or the assigned priority 302A can include a "super" priority such that an audio signal 180 indicative of the message 202A is prioritized by the audio device 104 over all other outputs 300A-D. In some implementations, the processor(s) can determine the assigned priority 302A-D based, at least in part, on the audio signal 180 that is currently being audibly produced by the audio device 104. In some implementations, at least one of the preferred priority and/or the assigned priority can be based, at least in part, on a distance associated with the computing device 102, as further described herein. Additionally, and/or alternatively, at least one of the preferred priority and/or the assigned priority can be based, at least in part, on a speed associated with the computing device 102, as further described herein.

At (420), the method 400 can include generating an output. For instance, the processor(s) can generate an output 300A-D indicative of the message 202A-D and the assigned priority 304A-D associated with the message 202A-D. In some implementations, the message 202A-F can be a textual message and the processor(s) can convert the textual message to an audio format capable of being audibly produced by the audio device 104. Additionally, and/or alternatively, the audio notification 300A-D can include a deadline 206A-D associated with the message 202A-D, as described herein. The processor(s) can determine the assigned priority 302A-D associated with the message 202A-D based, at least in part, on the deadline 206A-D and the output can be indicative of the deadline 206A-D.

At (422), the method 400 can include obtaining updated information from the sensor(s). For instance, the client applications 114 can obtain information from the sensor(s) 112 indicating a change in a condition associated with the computing device 102 (e.g., a change in location). At (424), the client applications 114 can update one or more of the audio notification(s) 200A-F (e.g., a message content, preferred priority, deadline). The client applications 114 can provide a set of data 150 indicative of an update to the audio notification 200A-F that revises at least one of the content of message 202A-F, the preferred priority 204A-F associated with the message 202A-F, and/or the deadline 206A-F associated with the message 202A-F, at (426).

At (428), the method 400 can include obtaining data indicative of an update. For instance, the processor(s) can obtain a set of data 150 indicative of an update to the audio notification 200A-F that revises at least one of the content of message 202A-F and/or the preferred priority 204A-F associated with the message 202A-F. At (430), the processor(s) can adjust the assigned priority 302A-D based, at least in part, on the set of data 150 indicative of the update to the audio notification 200A-F, as described herein.

At (432), the method 400 can include providing an output. For instance, the processor(s) can provide the output 300A-D to an audio device 104 to audibly produce the output 300A-D based, at least in part, on the assigned priority 302A-D associated with the message. At (434), the audio device 104 can obtain the output 300A-D and audibly produce the output 300A-D, at (436). For instance, to audibly produce the output 300A-D the audio device 104 can produce an audio signal 180 that is indicative of the message.

In some implementations, at (438), the audio device 104 can provide a set of data 160 indicating that the audio device 104 has audibly produced the output 300A-D. At (440), the method 400 can include obtaining data indicating that the output has been audibly produced. For instance, the processor(s) can obtain the set of data 160 indicating that the audio device 104 has audibly produced the output 300A-D. Additionally, and/or alternatively, at (442) the processor(s) can provide a second set of data 170 indicating that the audio device 104 has audibly produced the output 300A-D. The client applications 114 can obtain the second set of data 170. As described herein, the client applications 114 can cease providing data updating the audio notifications 200A-F based, at least in part, on the second set of data 170 indicating that the audio device 104 has audibly produced the output 300A-D.

FIG. 5 depicts an example system 500 that can be used to implement the methods and systems according to example aspects of the present disclosure. The system 500 can include the computing device 102 and one or more audio device(s) 104. The computing device 102 and the audio device(s) 104 can be configured to communicate via a network 510. In some implementations, the processor(s) (as described herein) can be associated with one or more remote computing device(s) 520 that are remote from the computing device 102. In such implementations, the remote computing device(s) 520 can be configured to communicate with the computing device 102 and/or the audio device(s) 104 via the network 510.

The computing device 102 can include one or more computing device(s) 530. The one or more computing device(s) 530 can include one or more processor(s) 532 and a memory device(s) 534. The one or more processor(s) 532 can include one or more central processing units (CPUs), graphics processing units (GPUs) dedicated to efficiently rendering images or performing other specialized calculations, and/or other processing devices. The memory device(s) 534 can include one or more computer-readable media and can store information accessible by the one or more processor(s) 532, including instructions 536 that can be executed by the one or more processor(s) 532 and data 538. The instructions 536 can be software written in any suitable programming language or can be implemented in hardware. Additionally, and/or alternatively, the instructions 536 can be executed in logically and/or virtually separate threads on processor(s) 532.

In some embodiments, the instructions 536 can be executed by the one or more processor(s) 532 to cause the one or more processor(s) 532 to perform operations, such as any of the operations and functions for implementing the controller application 116, any of the operations and functions for implementing the client applications 114, any of the operations and functions for which the processor(s) 532 and/or the computing device 102 are configured, as described herein, and/or any other operations or functions of the processor(s) 532 and/or the computing device 102.

For instance, one or more tangible, non-transitory computer-readable media can store computer-readable instructions 536 that when executed by one or more processor(s) 532 cause the one or more processor(s) 532 to perform operations. As further described herein, the operations can include obtaining one or more audio notification(s) 200A-D that comprise one or more message(s) 202A-D and one or more preferred priorities 204A-D associated with the one or more message(s) 202A-D; determining an assigned priority 304A-D for each of the one or more messages 202A-D based, at least in part, on a content of each of the one or more message(s) 202A-D and the preferred priority 204A-D associated with each of the one or more message(s) 202A-D; generating one or more output(s) 300A-D indicative of the one or more message(s) 202A-D and the assigned priority 304A-D associated with each of the one or more message(s) 202A-D; and providing the one or more output(s) 300A-D to the audio device 104 to audibly produce the one or more output(s) 300A-D based, at least in part, on the assigned priority 302A-D associated with each of the one or more message(s) 202A-D.

The computing device 102 can include various input/output devices 540 for providing and receiving information from a user, such as a touch screen, touch pad, data entry keys, speakers, and/or a microphone suitable for voice recognition. For instance, the computing device 102 can have a display device. Additionally, and/or alternatively, the computing device 102 can include one or more sensor(s) 112, as described herein.

The computing device 102 can also include a communication interface 542 used to communicate with one or more other component(s) of system 500 (e.g., audio device 104) over the network 510, for example, to provide and/or obtain data. The communication interface 542 can include any suitable components for interfacing with one more networks, including for example, transmitters, receivers, ports, controllers, antennas, or other suitable components.

The network 510 can be any type of communications network, such as a local area network (e.g. intranet), wide area network (e.g. Internet), cellular network, or some combination thereof. The network 510 can also include a direct (wired and/or wireless) connection between the computing device 102 and the audio device 104. In general, communication between the computing device 102 and the audio device 104 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL). In some implementations, the computing device 102 and the audio device 104 can communicate via one or more other technique(s) such as near-field communication, Bluetooth protocol, etc.

The audio device 104 can include a communication interface 560, one or more output device(s) 562, and/or various other components. The communication interface 560 can be used to communicate with one or more other component(s) of system 500 (e.g., computing device 102) over the network 510, for example, to provide and/or obtain data. The communication interface 560 can include any suitable components for interfacing with one more networks, including for example, transmitters, receivers, ports, controllers, antennas, or other suitable components. The output device(s) 562 can include a device that is configured to audibly produce audio signals (e.g., speaker, headset, etc.). For example, the output device(s) 562 can be configured to audibly produce one or more output(s) obtained from the computing device 102 such that a listener can have an opportunity to hear a message associated with the output(s). For example, at least one message can be associated with a navigation audio announcement.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein can be implemented using a single server or multiple servers working in combination. Databases and applications can be implemented on a single system or distributed across multiple systems. Distributed components can operate sequentially or in parallel.

Furthermore, computing tasks discussed herein as being performed at a server can instead be performed at a user device. Likewise, computing tasks discussed herein as being performed at the user device can instead be performed at the server.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of prioritizing audio announcements for an audio device, the method comprising:
   obtaining, by one or more processors associated with a computing device, a plurality of audio notifications from a plurality of different client applications, wherein each audio notification comprises a message and a preferred priority associated with the message that is designated by a respective client application;
   determining for each message of the plurality of audio notifications, by the one or more processors, an assigned priority associated with the respective message based at least in part on a content of the respective message and the preferred priority associated with the respective message;
   generating, by the one or more processors, one or more outputs indicative of the one or more messages and the respective assigned priority associated with each of the one or more messages; and
   providing, by the one or more processors, the one or more outputs to an audio device to audibly produce at least one of the outputs based at least in part on the respective assigned priorities associated with each of the respective messages.

2. The computer-implemented method of claim 1, wherein to audibly produce at least one of the outputs the audio device produces an audio signal indicative of at least one of the respective messages.

3. The computer-implemented method of claim 1, wherein determining for each message of the plurality of audio notifications, by the one or more processors, the assigned priority associated with the respective message comprises:
   determining, by the one or more processors, the assigned priority based at least in part on the one or more other audio notifications.

4. The computer-implemented method of claim 1, wherein at least one of the messages is a textual message, and wherein generating, by the one or more processors, the one or more outputs comprises:
   converting, by the one or more processors, the at least one textual message to an audio format capable of being audibly produced by the audio device.

5. The computer-implemented method of claim 1, wherein at least one of the respective preferred priorities or at least one of the respective assigned priorities comprises a super priority such that an audio signal indicative of the respective message is prioritized by the audio device over all other outputs.

6. The computer-implemented method of claim 1, wherein at least one of the preferred respective priorities or at least one of the respective assigned priorities is based at least in part on a distance associated with the computing device.

7. The computer-implemented method of claim 1, wherein at least one of the respective preferred priorities or at least one of the respective assigned priorities is based at least in part on a speed associated with the computing device.

8. The computer-implemented method of claim 1, wherein at least one of the audio notifications further comprises a deadline associated with the respective message, and wherein determining, by the one or more processors, the respective assigned priority associated with the respective message of the at least one audio notification comprises:
   determining, by the one or more processors, the assigned priority associated with the respective message based at least in part on the deadline, and wherein at least one of the one or more outputs is indicative of the deadline.

9. The computer-implemented method of claim 1, further comprising:
   obtaining, by the one or more processors, a set of data indicative of an update to at least one of the audio notifications that revises at least one of the content of the respective message or the respective preferred priority associated with the respective message.

10. The computer-implemented method of claim 9, further comprising:
    adjusting, by the one or more processors, the assigned priority associated with the respective message based at least in part on the set of data indicative of the update to the at least one audio notification.

11. The computer-implemented method of claim 1, further comprising:
    obtaining, by the one or more processors, a set of data indicating that the audio device has audibly produced at least one of the one or more outputs.

12. The computer-implemented method of claim 11, further comprising:
    providing, by the one or more processors, a second set of data indicating that the audio device has audibly produced at least one of the one or more outputs.

13. The computer-implemented method of claim 1, further comprising:
    obtaining, by the one or more processors, a set of data indicative of an audio signal that is currently being audibly produced by the audio device.

14. The computer-implemented method of claim 13, further comprising:
    determining, by the one or more processors, at least one of the assigned priorities based at least in part on the audio signal that is currently being audibly produced by the audio device.

15. A computing device comprising:
    one or more processors; and
    one or more memory devices, the one or more memory devices storing instructions that when executed by the one or more processors cause the one or more processors to perform operations, the operations comprising:
    obtaining a plurality of audio notifications from a plurality of different client applications, wherein each audio notification comprises a set of data indicative of a message and a preferred priority associated with the message that is designated by a respective client application;
    determining, for each message of the plurality of audio notifications, an assigned priority based at least in part on a content of the respective message and the preferred priority associated with the respective message;
    generating one or more outputs indicative of one or more of the messages and the assigned priority of each of the one or more messages; and
    providing the one or more outputs to an audio device.

16. The computing device of claim 15, wherein the operations further comprise:
    delaying the provision of at least one output to the audio device based at least in part on the assigned priority of the message indicated in the at least one output.

17. The computing device of claim 15, wherein the operations further comprise:

disregarding one or more of the audio notifications based at least in part on at least one of the content of the message, the preferred priority associated with the respective message, and the assigned priority associated with the respective message.

18. The computing device of claim 15, wherein at least one of the client applications is associated with a navigation functionality.

19. One or more tangible, non-transitory computer-readable media storing computer-readable instructions that when executed by one or more processors cause the one or more processors to perform operations, the operations comprising:

obtaining, from a plurality of different client applications, a plurality of audio notifications that each comprise a message and a preferred priority associated with the message that is designated by a respective client application;

determining an assigned priority for each of the messages based at least in part on a content of each of the messages and the preferred priority associated with each of the messages;

generating one or more outputs indicative of the messages and the assigned priority associated with each of the messages; and providing the one or more outputs to an audio device to audibly produce the one or more outputs based at least in part on the assigned priority associated with each of the messages.

20. The one or more tangible, non-transitory computer-readable media of claim 19, wherein at least one message is associated with a navigation audio announcement.

* * * * *